| United States Patent [19] | [11] Patent Number: 4,876,075 |
| Van Kleeck | [45] Date of Patent: Oct. 24, 1989 |

[54] REMOVAL OF H$_2$S FROM GAS STREAMS

[75] Inventor: David A. Van Kleeck, Houston, Tex.

[73] Assignee: Shell Oil Company, Houston, Tex.

[21] Appl. No.: 258,425

[22] Filed: Oct. 17, 1988

[51] Int. Cl.$^4$ .................. C01B 17/16; C01B 31/20
[52] U.S. Cl. ............................. 423/226; 423/573.1;
423/576.5; 423/576.6
[58] Field of Search ............. 423/573.1, 576.5, 576.6, 423/226

[56] References Cited

U.S. PATENT DOCUMENTS 4,741,888 5/1988 Fong et al. .................... 423/226
4,758,416 7/1988 Fong et al. .................... 423/226

Primary Examiner—Gregory A. Heller

[57] ABSTRACT

A process and apparatus for the removal of H$_2$S from sour gaseous streams is disclosed in which the sour gaseous stream is contacted with an aqueous reactant solution containing solubilized iron chelates. The contacting is carried out in first and second contacting zones, the first being a continuous liquid phase mixture formation zone and the second comprising a plurality of contacting sections adapted to provide reaction of the H$_2$S in the sour gaseous stream with the iron in the contacting solution by producing an upwardly flowing continuous liquid phase mixture comprising sour gas dispersed in the aqueous reactant solution.

11 Claims, 1 Drawing Sheet

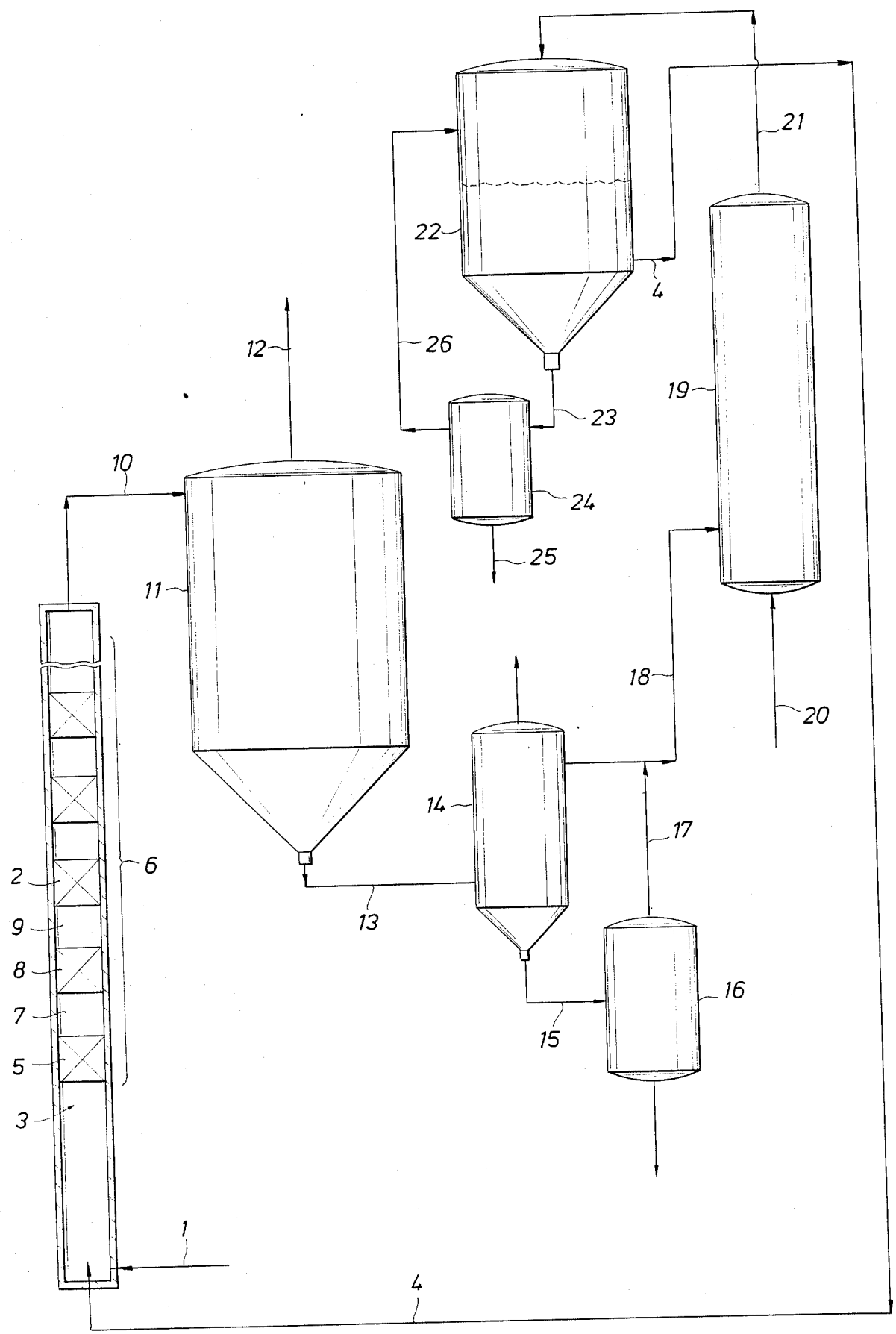

REMOVAL OF H2S FROM GAS STREAMS

FIELD OF THE INVENTION

The present invention relates to removal of $H_2S$ from gas streams with an aqueous reactant solution containing solubilized ferric chelate and solubilized ferrous chelate. Preferred reactants are iron (III) complexes in which the iron (III) forms complexes with specified organic acids and derivatives thereof.

BACKROUND OF THE INVENTION

The presence of of $H_2S$ in "sour" industrial gaseous streams poses a persistent problem. Although various procedures have been developed to remove and recover this contaminant, most such processes are deficient, for a variety of reasons.

While sour gaseous streams that contain relatively low concentrations of $H_2S$ may be treated successfully in a variety of ways with an aqueous polyvalent metal chelate or complex reactant solution to produce solid sulfur which is recovered either prior to or subsequent to regeneration of the reactant, if deep removal, e.g., greater than 95 percent removal of $H_2S$, is not required, removal of this level, or greater, demands efficiencies of operation if excessive costs of operation and materials are not to be incurred.

SUMMARY OF THE INVENTION

Accordingly, the invention relates to a process for removing $H_2S$ from a sour gaseous stream in which a solution containing solubilized iron chelate is provided for the oxidation of the $H_2S$, the process being characterized by the use of a unique solution contacting technique.

Accordingly, the invention, in one embodiment, relates to a process for the removal of $H_2S$ from a sour gaseous stream comprising a) intimately cocurrently contacting the sour gaseous stream in said first contacting zone with an upwardly flowing solution containing solubilized ferric chelate at a temperature below the melting point of sulfur, and at a sufficient solution to gas ratio and conditions effective to convert $H_2S$ to sulfur and inhibit sulfur deposition, and producing an upwardly flowing continuous mixture comprising sour gas in an aqueous reactant solution as the continuous phase;

(b) passing the continuous liquid phase mixture from step (a) (upwardly) through a plurality of enclosed contacting sections in serial flow communication in a second contacting zone, under conditions to convert $H_2S$ to sulfur and at a temperature below the melting point of sulfur, the first contacting section of said second contacting zone comprising a plurality of discrete sulfur deposition resistant channels, each discrete channel providing a diverted flow path for the continuous liquid phase mixture through the section, such that the continuous liquid phase mixture is directed at least initially at an angle acute to that of the direction of flow of the continuous liquid phase mixture entering the section; the second contacting section through which the continuous liquid phase mixture is passed comprising a plurality of discrete sulfur deposition resistant channels, each discrete channel providing a diverted flow path for the continuous liquid phase mixture through the section, such that the continuous liquid phase mixture is directed at least initially at an angle acute to that of the direction of flow of the continuous liquid phase mixture entering the section;, and producing a gas in reactant solution mixture containing solid sulfur in said second contacting zone; and (c) separating the gas having reduced $H_2S$ content from the gas in reactant solutio mixture reduced in content of solubilized ferric chelate produced in step (b). The gas having reduced $H_2S$ content may be separated from the solution in the second contacting zone, but is preferably separated in a separate vessel or step. If further purification is necessary or desired, the contacting procedure of steps (a) and b) may be repeated, or other contacting techniques or schemes, such as use of a sparged tower or towers, may be used. In such cases, appropriate measures will be taken for separation of the further purified gas and regeneration of the aqueous reactant solution(s) employed. For example, the solution produced by step (c) and additional solution from further purification or contacting steps may be combined and regenerated in a single regeneration step, sulfur removal being accomplished prior to or after the regeneration. Preferably, however, the gas having reduced $H_2S$ content from step (b) will simply be separated from the reactant solution, and a spent reactant solution containing sulfur will be recovered. In this case, sulfur will be removed from the spent reactant solution containing sulfur, and the spent reactant solution from which sulfur has been removed will be regenerated, producing a reactant solution having an increased concentratio of ferric chelate. The regenerated solution will then be passed to the first contacting zone for use as aqueous reactant solution therein.

The process of the invention in which the liquid reactant solution in the continuous phase is characterized by reduced fouling since the liquid provides continuously wetted channel surfaces which inhibit fouling by sulfur. The process also has much faster reaction rates, which result in much smaller contactors than countercurrent processes and the like.

In another embodiment, an optional contacting section is provided between the first and second contacting sections through which continuous liquid phase mixture is passed comprising an enclosed mixing section operative to or adapted to allow radial mixing of the continuous liquid phase mixture and redistribution of gas in solution.

In another embodiment, the sulfur is separated after regeneration. That is, the spent reactant solution containing sulfur is regenerated, producing a regenerated reactant solution containing sulfur, sulfur is then removed from said regenerated solution, and the regenerated reactant solution from which sulfur has been removed is passed to the first contacting zone for use as the aqueous reactant solution therein. Sulfur may also be removed during regeneration, although this is no usually preferred.

As used herein, the term "direction of flow" merely refers to the direction the bulk of the continuous liquid phase mixture is proceeding at the respective entrances of the sections at any given time, it being recognized that a minor portion or portions of the mixture may have, at least temporarily, directional movements different from the movement of the bulk or mass of the continuous liquid phase mixture. The acute (upward flow) path angles of the channels of a contacting section may vary considerably, but preferably the angles to the direction of flow will range from about 5° to about 60°, most preferably from about 15° to about 45°. Angles approaching 90° are less desirable, since such angles will increase the possibility of sulfur deposition and plugging. A limited amoun of "abrupt" change of the flow of the continuous liquid phase mixture may thus be tolerated in the invention, provided the radial mixing and redistribution section or sections of the invention are employed, as described more fully hereinafter. The channels may be oriented in different directions with respect to each other, while maintaining acute angles to the direction of flow. If a channel has a wide acute angle, or if the channel is positioned near the wall or walls of the second contacting zone, the flow of the continuous liquid phase mixture will be directed to and contact the wall or walls of the second contacting zone, and secondary channels, at an obtuse angle to the direction of flow, communicating with these channels, may provide flow of the continuous liquid phase mixture into the radial mixing sections. Preferably, the ratio of the length of the first contacting section to the length of the second contacting zone (length referring to the distance through the zone and section in the direction of flow) is no greater than about 0.5, preferably no greater than about 0.3. As used herein, the term "sulfur deposition resistant" refers to the quality or character of the walls of the discrete channels in being free or at least substantially free of sites where sulfur, present or produced in the continuous liquid phase mixture, may deposit. Such a surface may be produced by polishing, such as by electropolishing, or it may be formed by coating the surface with a suitable material, such as Teflon-type materials.

The redistribution section or sections accomplish the important function of redistributing the gas in the solution and inhibiting sulfur deposition. As used herein, the term "operative or adapted to allow radial mixing of the continuous liquid phase mixture and redistribution of gas in solution and to inhibit plugging due to sulfur formation" refers to the optional feature in which enclosed redistribution sections (1) do not contain structure, or have limited structure, which would inhibit or prevent radial mixing of gas and solution, and distribution or redistribution of the gas in the solution; (2) will be of sufficient width, and length in the direction of flow, to allow the radial mixing desired and eliminate plugging due to sulfur formation. Given these requirements, and the disclosure herein, those skilled in the art may determine by experimentation the minimum effective width and length of the redistribution section or sections (length referring to the distance through the sections in the direction of flow) and the appropriate ratio of the length of the respective channeled sections to the redistribution sections. In practice, the ratio will preferably range from about 0 to about 10, preferably from about 0.3 to about 4. Normally, the ratio of the length of the contacting section to the widest dimension of the section will range from about 0.2 to about 5, preferably about 0.3 to about 2. The dimensions of the first contacting zone are not critical, other than that it must be of a size where good distribution of the reactant solution in the gaseous stream is achieved. In this regard, the first contacting zone is an important part of the invention, since good initial intimate mixing of the gas stream and the reactant solution is important for efficiency. Any conventional mixing means can be employed which will give a good distribution of the reactant solution in the gaseous stream, such as a T-nozzle or the like.

As specified, at least two contacting sections are required in the second contacting zone, but beyond this, the number of additional contacting sections in the second contacting zone is not critical. The number of sections will be determined primarily by the amount of $H_2S$ to be removed and the desired degree of gaseous stream purity. Normally, from 2 to 20 or 30 contacting, or channeled sections will suffice, with from 1 to 20 or 30 redistribution sections being sufficient. It is a preferred embodiment of the invention that the contacting sections and the radial mixing sections alternate in the sequence of flow, so that sulfur deposition and plugging are eliminated or reduced. The shape of the enclosing walls of the contacting sections is not critical, but a generally cylindrical shape is preferred. The invention is admirably suited for use in the type of structure commonly referred to as a pipeline contactor, and the redistribution sections may simply be open spaces between the sections containing the structured, channeled internals.

It is a preferred aspect of the invention that, by suitable flow rates and design of the channeled sections, the flow of the gas in solution mixture through the second contacting zone will reach or approximate plug flow. Suitable structures for providing the channeled flow include, but are not limited to, chevron-type mixers, such as Koch static mixers or Glitsch Gempak mixers. The velocity of the gas treated may vary widely. Suitable gas velocities may range from about one foot per second to about 50 feet per second, with a range of from about five feet per second to about 30 feet per second being preferred. As noted, the aqueous reactant solution to gas ratio must be sufficient to provide effective removal of $H_2S$ while inhibiting or preventing sulfur deposition in the reaction zones. Preferably, the solution to gas ratio will range from about 0.2:100 to about 30:100, most preferably from about 0.5:100 to about 5:100, all by volume. Such ratios will generally be sufficient to provide good wetting of the channel surfaces so that sulfur deposition is inhibited or prevented. Such ratios will be high enough to prevent the gas from becoming the continuous phase.

The iron chelates employed include coordination complexes in which irons form chelates with an acid having the formula

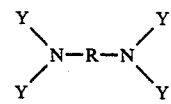

wherein
from two to four of the groups Y are selected form acetic and propionic acid groups;
from zero to two of the groups Y are selected from 2-hydroxyethyl, 2-hydroxypropyl, and

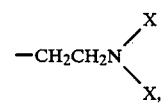

The iron chelates are supplied in solution as solubilized species, such as the ammonium or alkali metal salts (or mixtures thereof) of the iron chelates. As used herein, the term "solubilized" refers to the dissolved iron chelate or chelates, whether as a salt or salts of the aforementioned cation or cations, or in some other form, in which the iron chelate or chelates exist in solution. Where solubility of the chelate is difficult, and higher concentrations of chelates are desired, the ammonium salt may be utilized, as described in a similar process in commonly assigned, copending U.S. application Ser. No. 769,195, entitled "Process for the Removal of H$_2$S from Sour Gaseous Streams", filed Aug. 23, 1985, incorporated herein by reference. However, the invention may also be employed with more dilute solutions of the iron chelates, wherein the steps taken to prevent iron chelate precipitation are not critical. Exemplary chelating agents for the iron include aminoacetic acids derived from ethylenediamine, diethylenetriamine, 1,2-propylenediamine, and 1,3-propylenediamine, such as EDTA (ethylenediamine tetraacetic acid), HEEDTA (N-2-hydroxyethyl ethylenediamine triacetic acid), DETPA (diethylenetriamine pentaacetic acid); amino acetic acid derivatives of cyclic, 1,2-diamines, such as 1,2-diamino cyclohexane-N,N-tetraacetic acid, and 1,2-phenylene-diamine-N,N-tetraacetic acid, and the amides of polyamino acetic acids disclosed in Bersworth, U.S. Pat. No. 3,580,950.

The iron chelates also include those in which iron chelates of nitrilotriacetic acid are present in solution as a solubilized species, for example, solubilized ammonium or alkali metal salts of the iron chelates. As used herein, the term "solubilized" refers to the dissolved iron chelates mentioned, whether as a salt of the aforementioned cations, or in some other form, in which the iron chelates exist in solution. Preferably, the ammonium salt is utilized, as described in commonly assigned, copending U.S. application Ser. No. 769,195, entitled "Process for the Removal of H$_2$S from Sour Gaseous Streams", filed Aug. 23, 1985, incorporated herein by reference. However, the invention may also be employed with more dilute solutions of the iron chelates, wherein the steps taken to prevent iron precipitation are not critical.

The regeneration of the reactant is preferably accomplished by the utilization of oxygen, preferably as air. As used herein, the term "oxygen" is not limited to "pure" oxygen, but includes air, air enriched with oxygen, or other oxygen-containing gases. The oxygen will accomplish two functions, the oxidation of ferrous iron of the reactant to the ferric state, and the stripping of any residual dissolved gas (if originally present) from the aqueous admixture. The oxygen (in whatever form supplied) is supplied in a stoichiometric equivalent or excess with respect to the amount of solubilized iron chelate to be oxidized to the ferric state. Preferably, the oxygen is supplied in an amount of from about 20 percent to about 500 percent excess. Electrochemical regeneration may also be employed.

DETAILED DESCRIPTION OF THE INVENTION

The particular type of sour gaseous stream treated is not critical, the only practical limitation being the reactivity of the stream itself with the solutions employed, as will be evident to those skilled in the art. Streams particularly suited to removal of H$_2$S by the practice of the invention are, as indicated, naturally occurring gases, recycled CO$_2$ used in enhanced oil recovery, synthesis gases, process gases, and fuel gases produced by gasification procedures, e.g., gases produced by the gasification of coal, petroleum, shale, tar sands, etc. Particularly preferred are coal gasification streams, natural gas streams, produced and recycled CO$_2$ streams, and refinery feedstocks composed of gaseous hydrocarbon streams, especially those streams of this type having a low ratio of H$_2$S to CO$_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The H$_2$S content of the type of streams contemplated will vary extensively, but, in general, will range from about 0.005 percent to about 10 percent by volume. CO$_2$ may or may not be present, but if present, may range in content from about 0.1 percent to about 99.0 percent (or more) by volume. In this context, the invention may be used to remove H$_2$S from various CO$_2$ streams, e.g., supercritical CO$_2$ streams. Obviously, the amounts of H$_2$S and CO$_2$ present are not generally a limiting factor in the practice of the invention. The stream treated may also have been treated initially for H$_2$S removal, by this or some other technique.

The temperatures employed in the contacting zones are not generally critical, except that the reaction is carried out below the melting point of sulfur. In many commercial applications, such as removal of H$_2$S from natural gas to meet pipeline specifications, absorption at ambient temperatures is desired. In general, temperatures of from 10° C. to 80° C. are suitable, and temperatures of from 20° C. to 60° C are preferred. Total contact times may be varied widely, but will preferably range from about 0.1 second to about 10 seconds, with total contact times of about 0.5 second to about 5 seconds being most preferred.

Similarly, in the regeneration or stripping zone or zones, temperatures can be varied widely. Preferably, the regeneration zone should be maintained at somewhat lower temperatures compared to the contacting zone. In general, temperatures of from about 10° C. to 80° C., preferably 20° C. to 50° C., may be employed.

Pressure conditions in the contacting zones may vary widely, depending on the pressure of the gas to be treated. For example, pressures in the contacting zones may vary from one atmosphere up to one hundred fifty or even two hundred atmospheres. Pressures of from one atmosphere to about one hundred atmospheres are preferred. In the regeneration zone, pressures may be varied considerably, and will preferably range from about one atmosphere to about three or four atmospheres. Residence times for given volumes of admixture and oxygen will also vary, but preferably will range from about 1 minute to about 60 minutes, most preferably from about 1 minute to about 40 minutes. The pressure, fluid flow, and temperature relationships involved are well understood by those skilled in the art. For example, as described in Specchia, V. et al., *AIChE Journal*, 20 (4), pp. 646–653 (July 1974), the gas flow rate and relative liquid mass velocity/gas mass velocity determine the kind of cocurrent upward flow. Low gas velocity will result in bubble flow in which the gas phase moves as bubbles in the continuous liquid phase. When the gas flow rate increases, the interaction first causes alternate annular liquid and gas plusing or slug flow, and then at higher rates, minute droplets of liquid suspended in the gas phase (spray flow), while part of the liquid flows as a film over the surfaces of the contacting zone. Preferably, the upward flow is in the form of a spray flow. Other conditions of operation for this type of reaction process are further described in U.S. Pat. No. 3,068,065 to Hartley et al, dated Dec. 11, 1962, incorporated herein by reference, and in the aforementioned application. Preferably, pH in the regeneration zone will range from about 6.5 to about 8.5, and the molar ratio of the nitrilotriacetic acid to total solubilized iron is from about 1.0 to 1.5. The process is preferably conducted continuously.

As indicated, the $H_2S$, when contacted, is rapidly converted in the process of the invention by the solubilized ferric chelate of nitrilotriacetic acid to solid elemental sulfur. Since the iron chelates per se have limited solubility in water, the iron chelate compound or compounds are preferably supplied, as indicated previously. The amount of solubilized ferric chelate supplied or employed in solution is an amount sufficient to reduce the $H_2S$ concentration or content of the stream to the desired level. If total or substantially total removal is desired, the total amount supplied will generally be on the order of at least about two mols per mol of $H_2S$. Ratios of from about 2 mols to about 15 mols of solubilized ferric chelate per mol of $H_2S$ may be used, with ratios of from about 2 mols per mol to about 5 mols of solubilized ferric chelate per mol of $H_2S$ being preferred. The molar ratio of the ferric chelate to the ferrous chelate of present in the contacting solution will normally be less than about 6, and will preferably range from about 0.2 to about 6, most preferably about 0.5 to about 6. The chelate solution will generally be supplied as an aqueous solution having a concentration of from about 0.1 molar to about 3 molar; a concentration of from about 0.5 to about 1.5 molar is preferred. The total iron concentration (ferrous plus ferric), will range from about 0.01 percent to about 7 percent by weight, preferably about 1.5 to about 2.5, based on the weight of the solution and the iron. As indicated, the solubilized iron chelates can be formed in aqueous solution by the reaction of elemental iron or of an appropriate salt, oxide, or hydroxide of iron and chelating acid, in the presence of alkali metal or ammonium ions, or with the ammonium or alkali metal salt.

BRIEF DESCRIPTION OF THE DRAWING ILLUSTRATIVE EMBODIMENT

In order to describe the invention in greater detail, reference is made to the accompanying schematic drawing. The drawing illustrates an embodiment of the invention wherein the sour gas contacting zones are vertically disposed and sulfur removal is accomplished in a separate step before regeneration. All values are calculated or merely exemplary, and all flows, unless stated otherwise, are continuous.

As shown, sour gas, e.g., a nitrogen gas stream containing about 0.4–5 percent $H_2S$, in line (1) flows into generally cylindrical column (2) wherein it was intimately contacted in zone (3) thereof with an upward flow of an aqueous mixture from line (4) which comprises ferric chelate, such as an aqueous solution of about 0.25M ammonium ferric nitrilotriacetate chelate, which mixture also contains about 0.25 moles per liter of ammonium ferrous nitrilotriacetate chelate and about 0.25 mole per liter of thiosulfate-ion, pH of the solution being adjusted to 7.5 to 8 by the addition of ammonium hydroxide. The solution was produced by utilization of the reducing effect of the $H_2S$ in the gaseous stream. That is, the initial solution employed in the contacting zone illustrated is about 0.5M aqueous solution of ferric nitrilotriacetate also containing about 2.5M ammonium ion. After start-up, and reaction with $H_2S$ in the gaseous stream, regeneration, described hereinafter, is controlled, so that regeneration of the ammonium ferric nitrolotriacetic acid complex is not complete, in the ratios mentioned.

In zone (3), the gas stream containing $H_2S$ and the aqueous reactant mixture are intimately mixed to form a continuous liquid phase mixture comprising sour gas in aqueous reactant liquid, sulfur almost immediately forming, and the continuous liquid phase mixture is passed upwardly in cocurrent relationship to the first section (5) of contacting zone (6). Any suitable device or technique which provides intimate mixing or contacting of the gas and aqueous reactant mixture to form a continuous liquid phase can be employed. For example, sparged towers can be utilized to produce a bubble flow or preferably a T-nozzle to produce a spray flow of continuous liquid phase mixture. In any event, contacting section (5) comprises a chevron-type flow directing element which provides a plurality of discrete channels for the passage and direction of the continuous liquid phase mixture at a 60° angle to the direction of flow to the side of the cylindrical column. In this illustration, the element used is a Koch SMV ® mixing element. To insure that the surfaces of the channels are resistant to any sulfur deposition, the mixing element (and all those described hereinafter for zone [6]) are electropolished before use. The superficial velocity of the gas is about 20 ft/sec., and the liquid to gas volumetric flow ratio is 10:100. The width of the channels of the element is about ½ inch, and the diameter of the column is about 3 inches. The length of element (5) in the direction of flow is about 3 inches. As indicated, other types of elements can be employed. At the outlets of the channels of element (5), the continuous liquid phase mixture from the channels may or may not enter an open section (7) of variable length of contacting zone (6) where the continuous liquid phase mixture can mix radially and where redistribution of the solution and gas occurs. The continuous liquid phase mixture, with increasing solid sulfur content, passes through chevron element (8), which is identical to element (5). Element (8) is preferably misoriented with respect to element (5).

The gas in reactant continuous liquid phase mixture, upon leaving the channels of element (8), passes through redistribution section (9), where the dimensions and operation are similar to that occurring in section (7). The flow of the gas in reactant continuous liquid phase mixture through the remaining corresponding sections of zone (6) is similar to that described with respect to the first four sections, and need not be described, except to note that the $H_2S$ in the gas stream was continually being reduced, with concomitant sulfur formation and reduction of the $Fe^{+++}$ chelate concentration.

At the discharge end of column (2), the gas in reactant continuous liquid phase mixture, now containing solid sulfur, passes from vessel (2), and is sent via line (10) to a separating unit or vessel (11) where the nitrogen gas was separated from the liquid and sulfur. Purified gas was removed overhead via line (12), and "spent" reactant liquid and sulfur are removed via line (13).

As those skilled in the art will recognize, solution concentrations, sulfur content, and ferric-ferrous ligand concentrations and ratios must be regulated to achieve appropriate $H_2S$ removal. To maintain appropriate ferric concentrations and provide sulfur removal stream (13) is sent for regeneration and sulfur removal.

In one embodiment, line (13) connects directly with line (18) (not illustrated) so that the aqueous admixture in vessel (11) was transferred into regenerator (19). In regeneration zone or column (19), which can be a sparged tower, the admixture was contacted cocurrently with excess air in line (20) to convert ferrous chelate of nitrilotriacetic acid to ferric chelate of nitrilotriacetic acid. Air velocity in the regenerator is in the range of 0.1 to 0.3 feet per second, the temperature of the liquid is about 45° C., and overall pressure is about 2 atmospheres. Spent air was removed via line (21), and regenerated admixture, having a ratio of ferric chelate of nitrilotriacetic acid to ferrous chelate of nitrilotriacetic acid of about 3, was introduced into surge/settler (22) wherein the admixture was allowed to separate. A sulfur slurry was removed via line (23) to filter (24) from which sulfur was removed via line (25). Regenerated reactant solution was removed from vessel (22) via line (4) and recycled to the contactor. Solution was removed from filter (24) via line (26) and recycled to vessel (22).

In one alternative process, the aqueous admixture in line (13) is optionally sent to a depressurization and degassing unit (14), which also serve as a sulfur concentration or thickening zone. A minor portion, e.g., 2 to 5 percent by volume of the admixture in settler or thickener (14), and containing an increased sulfur concentration, is continuously withdrawn from the lower portion of settler or concentrator (14) and sent via line (15) to sulfur recovery in filter unit (16).

Sulfur recovery can be accomplished in any suitable fashion, such as by filtration. For example, sulfur can also be recovered by that method described in commonly assigned copending application Ser. No. 769,198, entitled "Separation of Sulfur from Chelate Solutions", filed Aug. 23, 1985, incorporated herein by reference. As those skilled in the art will recognize, sulfur may be removed after regeneration, if desired. In any event, solution recovered during sulfur recovery may be returned to any suitable point in the process, if proper adjustment is made. Preferably, however, the solution recovered is sent to the regeneration zone, as shown, via lines (17) and (18).

The major portion of the aqueous admixture in vessel (14), when used, is removed via line (18) for regeneration of the ferric chelate of nitrilotriacetic acid.

As will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which are beneficial, and other additives, such as additives to improve sulfur separation, or antifoaming and/or wetting agents, may be employed.

In a similar manner, a natural gas stream containing about 0.5 percent $H_2S$ is treated with the above reactant solution or with a reactant solution which comprises about 0.6 M aqueous solution of ammonium ferric N-(2-hydroxyethyl)ethylene diamine triacetate chelate, which mixture also contains about 0.2 moles per liter of ammonium ferrous N-(2-hydroxyethyl)ethylene diamine triacetate chelate and about 0.25 moles per liter of thiosulfate-ion, pH of the solution being adjusted to 7.5 to 8 by the addition of ammonium hydroxide. The solution is produced by utilization of the reducing effect of the $H_2S$ in the gaseous stream. That is, the initial solution employed in the contacting zone illustrated is a 0.8 M aqueous solution of ferric N-(2-hydroxyethyl)ethylene diamine triacetate chelate also containing sufficient added ammonium hydroxide to maintain the pH of the solution at 6.5 to 8.5. After start-up, and reaction with $H_2S$ in the gaseous stream, regeneration, as described hereinbefore, is controlled, so that regeneration of the ammonium ferric chelate is not complete, in the ratios mentioned.

What is claimed is:

1. A process for the removal of $H_2S$ from a sour gaseous stream comprising
    (a) intimately cocurrently contacting the sour gaseous stream in said first contacting zone with an upwardly flowing aqueous reactant solution containing solubilized ferric chelate and solubilized ferrous chelate, at a temperature below the melting point of sulfur, at sufficient solution to gas ratio and conditions effective to convert $H_2S$ to sulfur and inhibit sulfur deposition, and producing an upwardly flowing continuous liquid phase mixture comprising sour gas dispersed in an aqueous reactant solution as the continuous phase;
    (b) passing the continuous liquid phase mixture from step (a) through a plurality of enclosed contacting sections in serial flow communication in a second zone, under conditions to convert $H_2S$ to sulfur and at a temperature below the melting point of sulfur, the first contacting section of said second contacting zone comprising a plurality of discrete sulfur deposition resistant channels, each discrete channel providing a diverted flow path for the continuous liquid phase mixture through the section, such that continuous liquid phase mixture is directed at least initially at an angle acute to that of the direction of flow of the continuous liquid phase mixture entering the section; the second contacting section through which the continuous liquid phase mixture is passed comprising a plurality of discrete sulfur deposition resistant channels, each discrete channel providing a diverted flow path for the continuous liquid phase mixture through the section, such that the continuous liquid phase mixture is directed at least initially at an angle acute to that of the direction of flow of the continuous liquid phase mixture entering the section; and producing a gas in reactant continuous liquid phase mixture containing solid sulfur in said second contacting zone;
    (c) separating the gas having reduced $H_2S$ content from the gas in reactant solution mixture reduced in content of solubilized ferric chelate produced in step (b).

2. A process according to claim 1 wherein the aqueous reactant solution containing solubilized ferric chelate is a chelate of an acid having the formula

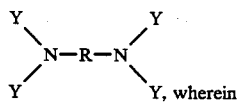

from two to four of the groups Y are selected from acetic and propionic acid groups
from zero to two of the groups Y are selected from 2-hydroxyethyl, 2-hydroxypropyl and

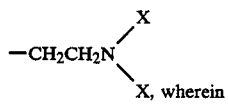

X is selected from acetic acid and propionic acid groups; and

R is ethylene, propylene or isopropylene or alternati cyclohexane or benzene where the two hydrogen atoms replaced by nitrogen are in the 1,2-position, and mixtures thereof, and the solubilized ferrous chelate is a ferrous chelate of said acid or acids.

3. A process according to claim 1 wherein the ferric and ferrous chelates are each of nitrilotriacetic acid.

4. The process of claim 1 wherein an optional contacting section is located between the first and second contacting section through which continuous liquid phase mixture is passed comprising an enclosed mixing section adapted to allow radial mixing of the continuous liquid phase mixture and redistribution of gas in solution.

5. The process of claim 1 wherein the solution having a reduced content of the ferric chelate and the solution having a reduced content of acid forming said chelate from said additional contacting zone or zones are regenerated in a regeneration zone.

6. The process according to claim 1 wherein the upwardly flowing continuous liquid phase mixture is a spray flow.

7. A process for the removal of $H_2S$ from a sour gaseous stream comprising
   (a) intimately cocurrently contacting the sour gaseous stream in said first contacting zone with an upwardly flowing aqueous reactant solution containing solubilized ferric chelate and solubilized ferrous chelate, at a temperature below the melting point of sulfur, at sufficient solution to gas ratio and conditions effective to convert $H_2S$ to sulfur and inhibit sulfur deposition, and producing an upwardly flowing continuous liquid phase mixture comprising sour gas dispersed in an aqueous reactant solution;
   (b) passing the continuous liquid phase mixture from step (a) through a plurality of enclosed contacting sections in serial flow communication in a second contacting zone, under conditions to convert $H_2S$ to sulfur and at a temperature below the melting point of sulfur, the first contacting section of said second contacting zone comprising a plurality of discrete sulfur deposition resistant channels, each discrete channel providing a diverted flow path for gas in solution mixture through the section, such that the continuous liquid phase mixture is directed at least initially at a angle acute to that of the direction of flow of the continuous liquid phase mixture entering the section; the second contacting section through which the continuous liquid phase mixture is passed comprising a plurality of discrete sulfur deposition resistant channels, each discrete channel providing a diverted flow path for gas in solution mixture through the section, such that the continuous liquid phase mixture is directed at least initially at an angle acute to that of the direction of flow of the the continuous liquid phase mixture entering the section; and producing a gas in reactant continuous liquid phase mixture containing solid sulfur in said second contacting zone; and
   (c) separating the gas having reduced $H_2S$ content from the gs in reactant solution mixture reduced in content of solubilized ferric chelate produced in step (b), and recovering a spent reactant solution containing sulfur;
   (d) removing sulfur from said spent reactant solution containing sulfur;
   (e) regenerating spent reactant solution from which sulfur has been removed, producing a reactant solution having an increased concentration of ferric chelate; and
   (f) passing regenerated solution from step (e) to the first contacting zone for use as aqueous reactant solution therein.

8. A process according to claim 7 wherein the aqueous reactant solution containing solubilized ferric chelate is a chelate of an acid having the formula

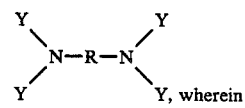

from two to four of the groups Y are selected from acetic and propionic acid groups
from zero to two of the groups Y are selected from 2-hydroxyethyl, 2-hydroxypropyl and

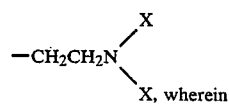

X is selected from acetic acid and propionic acid groups; and

R is ethylene, propylene or isopropylene or alternatively cyclohexane or benzene where the two hydrogen atoms replaced by nitrogen are in the 1,2-position, and mixtures thereof, and the solubilized ferrous chelate is a chelate of said acid or acids.

9. A process according to claim 7 wherein the ferric and ferrous chelates are each of nitrilotriacetic acid.

10. A process according to claim 7 wherein the upwardly flowing continuous liquid phase mixture is a spray flow.

11. A process according to claim 7 wherein an optional contacting section is located between the first and second contacting sections through which the continuous liquid phase mixture is passed comprising an enclosed mixing section adapted to allow radial mixing of continuous liquid hase mixture and redistribution of gas in solution.

* * * * *